(12) United States Patent
Stam

(10) Patent No.: US 6,246,416 B1
(45) Date of Patent: Jun. 12, 2001

(54) METHOD FOR MODELING REFLECTION OF LIGHT FROM AN ANISOTROPIC SURFACE

(75) Inventor: Jos Stam, Seattle, WA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/201,813

(22) Filed: Dec. 1, 1998

(51) Int. Cl.$^7$ .................................................. G06T 15/60
(52) U.S. Cl. ............................................................. 345/426
(58) Field of Search .................................. 345/426, 430, 345/418, 419

(56) References Cited

U.S. PATENT DOCUMENTS

| | | | |
|---|---|---|---|
| 5,870,096 | * | 2/1999 | Anjyo et al. .......................... 345/426 |
| 5,949,424 | * | 9/1999 | Cabral et al. ......................... 345/426 |
| 6,034,691 | * | 3/2000 | Aono et al. ........................... 345/425 |

OTHER PUBLICATIONS

Marek Teichmann, Surface reconstruction with anisotropic density–scaled alpha alpha shapes, 1998, IEEE, p. 67–72.*
Pat Hanrahan, Reflection from layered surfaces due to subsurface scattering, Proceedings of the 20th annual conference on Computer graphics, 1993, pp. 165–174.*
Ward, "Measuring and Modeling Anisotropic Reflection," *Computer Graphics (SIGGRAPH '92 Conference Proceedings)*, vol. 26, No. 2, Jul. 1992, pp. 265–272.
Bahar and Chakrabarti, "Full–Wave Theory Applied to Computer–Aided Graphics for 3D Objects," *IEEE Computer and Applications (Special Issue: Supercomputers for Graphics)*, Jul. 1987, pp. 46–60.
Sheppard, "Imaging of random surfaces and inverse scattering in the Kirchhoff approximation," *Waves in Random Media*, vol. 8, No. 1, Jan. 1998, pp. 53–66.
Westin et al., "Predicting Reflectance Functions from Complex Surfaces," *Computer Graphics* (SIGGRAPH '92 Conference Proceedings) vol. 26, No. 2, Jul. 1992, pp. 255–264.
He et al., "A Comprehensive Physical Model for Light Reflection," *Computer Graphics (SIGGRAPH '91 Conference Proceedings)*, vol. 25, No. 4, Jul. 1991, pp. 175–186.
Kajiya, "Anisotropic Reflection Models," *Computer Graphics (SIGGRAPH '85 Conference Proceedings)*, vol. 19, No. 3, Jul. 1985, pp. 15–21.
Poulin and Fournier, "A Model for Anisotropic Reflection," *Computer Graphics (SIGGRAPH '90 Conference Proceedings)*, vol. 24, No. 4, Aug. 1990, pp. 273–282.

\* cited by examiner

*Primary Examiner*—Mark Zimmerman
*Assistant Examiner*—Huedung X. Cao
(74) *Attorney, Agent, or Firm*—Sterne Kessler Goldstein & Fox P.L.L.C.

(57) ABSTRACT

The invention provides a method for performing computer graphic simulation of an anisotropic surface reflecting light towards a viewer. First, the data necessary to calculate the amount of light reflected from each point of the anisotropic surface toward the viewer is obtained. This data includes a statistical description of the surface, as well as information about the light and its directions of incidence and reflection. The data is then sent to a renderer, which calculates the amount of light reflected from each point of the anisotropic surface toward the viewer. An image is then created, based on the calculated values. The calculation step is performed with the aid of a model that is derived from wave physics. The model also relies on a statistical, probabilistic description of the anisotropic surface, a description which treats the height of any given point on the surface as a random variable. In cases where the surface is anisotropic but has a more periodic profile, a variation of this model can be used.

12 Claims, 6 Drawing Sheets rect(x)

g(x)

rect(x) g(x)

METHOD FOR MODELING REFLECTION OF LIGHT FROM AN ANISOTROPIC SURFACE

BACKGROUND OF THE INVENTION

1. Field of the Invention

The invention relates to generating and displaying computer images which depict reflected light, and more particularly to a method for simulating the appearance of an anisotropic surface as it reflects light towards a viewer.

2. Related Art

The interaction of light with surfaces has proven to be one of the most complicated and fundamental problems in computer graphics. Considerable research has addressed simulation of light reflected from isotropic surfaces. Models for computer graphic simulation of anisotropic reflection (i.e., reflection of light from rough surfaces) have also been proposed, but are based on either non-physical reflection functions obtained using numerical simulations, or are estimated from experimental data. None of the existing anisotropic models are based on the known physical properties of light. Yet, a physics based approach would be the most appropriate for simulating the natural reflection of light from an anisotropic surface. Such an approach would allow simulation of the image that a viewer would see of light reflected from such a surface. Moreover, in the case of anisotropic surfaces having periodic profiles, the reflection of light from such surfaces has never been modeled in computer graphics. Hence there is a need for a physics-based method by which light, reflected from an anisotropic surface, can be simulated in a computer graphics environment.

SUMMARY OF THE INVENTION

The invention provides a method for performing computer graphic simulation of an anisotropic surface reflecting light towards a viewer. First, the data necessary to calculate the amount of light reflected from each point of the anisotropic surface toward the viewer is obtained. This data includes a statistical description of the surface, as well as information about the light and its directions of incidence and reflection. The data is then sent to a renderer, which calculates the amount of light reflected from each point of the anisotropic surface toward the viewer. An image is then created, based on the calculated values.

The calculation step is performed with the aid of a model that is derived from wave physics. The model also relies on a statistical, probabilistic description of the anisotropic surface, a description which treats the height of any given point on the surface as a random variable. In cases where the surface is anisotropic but has a more periodic profile, a variation of this model can be used.

The invention has the feature of requiring relatively few parameters as input to the calculation step.

The invention has the additional feature of being suited to a physics-based renderer, since the model takes into account wave dependent phenomena.

The invention has the advantage of being applicable to a wider range of surfaces than those considered in previous models.

The invention has the further advantage of being relatively easy to implement, since the calculation step is only moderately complex.

BRIEF DESCRIPTION OF THE FIGURES

The foregoing and other features and advantages of the invention will be apparent from the following, more particular description of a preferred embodiment of the invention, as illustrated in the accompanying drawings.

The preferred embodiment of the invention is now described with reference to the figures where like reference numbers illustrate like elements. In the figures, the left most digit of each reference number corresponds to the figure in which the reference number is first used.

DETAILED DESCRIPTION OF THE PREFERRED EMBODIMENTS

I. Overview

The invention provides a method for creating a computer graphic image of an anisotropic surface that is reflecting light towards a viewer. The method calculates the amount of light reflected towards the viewer using a model derived from the laws of physics and statistics. The model is a distribution function that describes the distribution of light reflected in any given direction. Inputs to the calculation include the angles of incidence and reflection relative to the surface, the wavelength of the light, and a statistical description of the shape of the anisotropic surface.

A. Environment of the Present Invention

Figure 1:
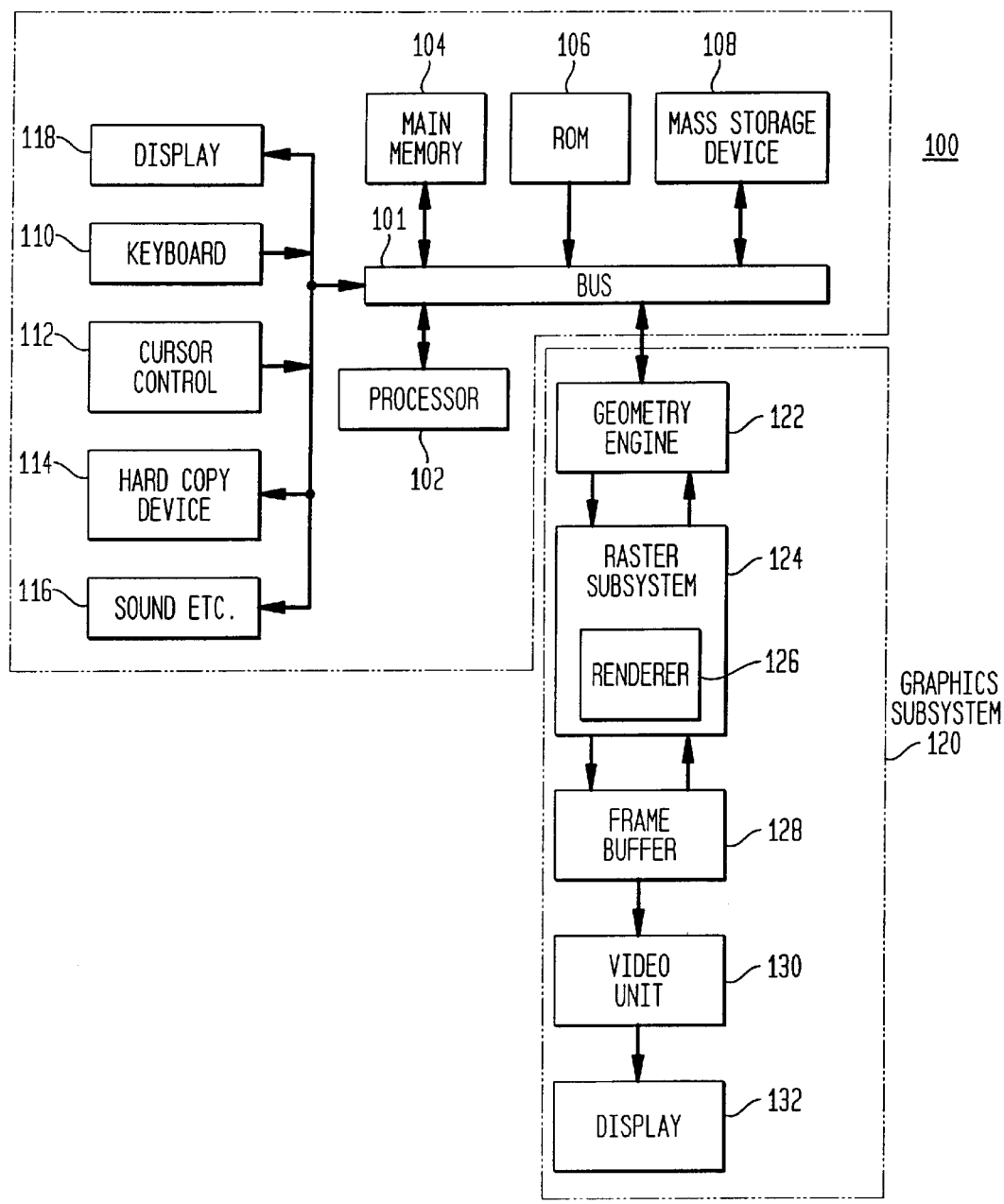
FIG. 1 is a high level block diagram of a computer system used to implement an embodiment of the present invention.

Referring to FIG. 1, a block diagram of a computer graphics display system 100 is shown. System 100 is exemplary only and it is not intended that the invention be limited to application in this example environment. In fact, after reading the following description, it will become apparent to a person skilled in the relevant art how to implement the invention in alternative environments. System 100 drives a graphics subsystem 120 for generating images according to the present invention. In a preferred embodiment, the graphics subsystem 120 is utilized as a high-end, interactive computer graphics workstation.

System 100 includes a host processor 102 coupled through a data bus 101 to a main memory 104, read only memory (ROM) 106, and a mass storage device 108. Mass storage device 108 is used to store a vast amount of digital data relatively cheaply. For example, the mass storage device 108 can consist of one or more hard disk drives, floppy disk drives, optical disk drives, tape drives, CD ROM drives, or any number of other types of storage devices having media for storing data digitally.

Different types of input and/or output (I/O) devices are also coupled to processor 102 for the benefit of an interactive user. An alphanumeric keyboard 120 and a cursor control device 112 (e.g., a mouse, trackball, joystick, etc.) are used to input commands and information. The output devices include a hard copy device 114 (e.g., a laser printer) for printing data or other information onto a tangible medium. A sound recording or video option 116 and a display screen 118 can be coupled to the system 100 to provide for multimedia capabilities.

Graphics data is provided from processor 102 through data bus 101 to the graphics subsystem 120. The graphics subsystem 120 includes a geometry engine 122, a raster subsystem 124 coupled to a texture memory 126, a frame buffer 128, video board 130, and display 132.

The present invention is preferably implemented using software executing in an environment similar to that described above with respect to FIG. 1. In this document, the term "computer program product" is used to generally refer to a removable storage device (not shown), mass storage device 108 or ROM 106. Computer programs (also called computer control logic) are stored in the removable storage device, ROM 106, or mass storage device 108. Such computer programs, when executed, enable the computer system 100 to perform the features and functions of the present invention as discussed herein. Accordingly, such computer programs represent controllers of the computer system 100.

Figure 2:
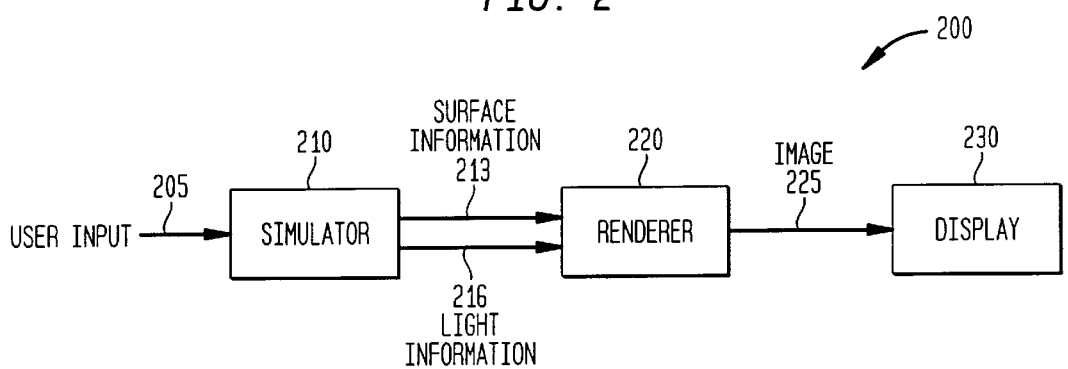
FIG. 2 is a high level block diagram of a simulator, renderer, and display unit, and the data flowing among them, according to an embodiment of the invention.

FIG. 2 illustrates the present invention generally. Simulator 210 outputs the values required by the distribution function to a renderer 220. Renderer 220 performs a variety of tasks that result in an image 225 being displayed on a display device 230. These tasks include calculating the distribution of light reflected from a surface, according to the model described below. Renderer 220 takes two types of input from simulator 210, information about the surface 213 and information about the light 216. Surface information 213 comprises a statistical description of the roughness of the surface and the refraction index of the surface. Light information 216 comprises the direction from which the light strikes the surface, the direction in which light is reflected towards the viewer, and the wavelength of the light. Renderer 220 then calculates the distribution of light reflected towards the viewer, and produces a two-dimensional image depicting the illuminated surface. In a preferred embodiment, renderer 220 actively queries simulator 210 for data The present invention contemplates two modes of rendering. The first mode uses graphics subsystem 120. An exemplary graphics engine that can implement the present invention is a Reality Engine available from Silicon Graphics, Mountain View, Calif. The first mode of operation allows real-time display. The second mode of operation does not require a graphics engine. Rather, the renderer is executed as a batch process. This is performed by, for example, processor 102.

B. Reflection Model

Figure 3:
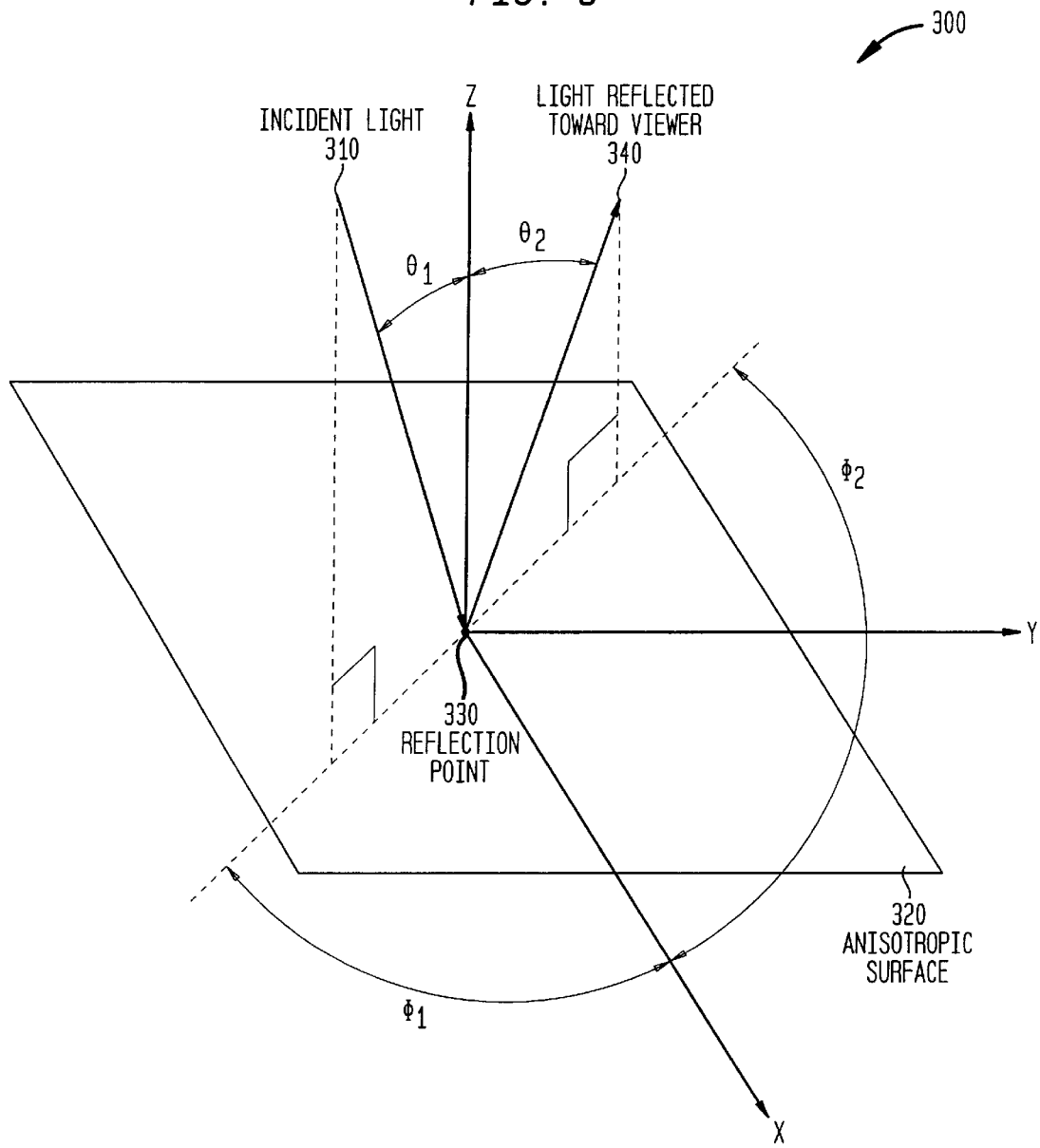
FIG. 3 illustrates the direction of the incidence of light on a surface and the direction of reflection, as described in spherical coordinates.

The invention incorporates a surface reflection model that describes the distribution of reflected light from an anisotropic surface for each possible direction of incoming light. FIG. 3 illustrates incident light 310 striking an anisotropic surface 320 at a reflection point 330. Incident light 310 strikes point 330 from a direction ($\phi_1$, $\theta_1$), expressed in spherical coordinates. Reflected light 340 is reflected towards a viewer in a direction ($\phi_2$, $\theta_2$). The distribution of light reflected in that direction is given by the function $\rho$. This distribution $\rho$ is given by the expression $$\rho = \frac{F^2(1-\hat{k}_1\cdot\hat{k}_2)^2}{\cos\theta_1\cos\theta_2 w^2}\left(\frac{k^2}{4\pi^2}S_p(ku, kv) + |\mu_p|^2\delta_2(u, v)\right)$$

where $F=F(\theta_1, n_\lambda)$, the Fresnel coefficient;

$n_\lambda$ is the refractive index of the surface material;

$v_1$ is the angle between the incident light and the surface's normal vector, i.e., the second spherical coordinate of the incident light, illustrated in FIG. 3.

$\theta_2$ is the angle between the direction of reflectance towards the viewer and the surface's normal vector, i.e., the second spherical coordinate of the direction of reflectance towards the viewer, illustrated in FIG. 3.

$w=-\cos\theta_1-\cos\theta_2$;

$\hat{k}_1$ is the unit vector pointing from the reflection point on the surface towards the light source;

$\hat{k}_2$ is the unit vector pointing from the reflection point towards the viewer;

$k=2\pi/\lambda$;

$\lambda$ is the wavelength of the incident light;

$$S_p(ku, kv) = \sigma_p^2 \int_{-\infty}^{\infty}\int_{-\infty}^{\infty} C_p(x, y)e^{ik(ux+vy)}dxdy$$

$u=-\cos\phi_1\sin\theta_1-\cos\phi_2\sin\theta_2$;

$v=\sin\phi_1\sin\theta_1=\sin\phi_2\sin\theta_2$;

$\phi_1$ is the first spherical coordinate of the incident light, illustrated in FIG. 3.

$\phi_2$ is the first spherical coordinate of the direction of the reflectance illustrated in FIG. 3.

$C_p(x,y)$ is the correlation function of the function p (x,y);

$\sigma_p$ is the standard deviation of the function p (x,y);

p $(x,y)=e^{(ikwh(x,y))}$;

$\mu_p X_1(kw)$;

$X_1$ is a characteristic function of the surface height; and $\delta_2$ is a 2-dimensional delta function, $\delta_2(u, v)=1$ if $u=v=0$, $\theta_1=\theta_2$, $\theta_2=\pi-\theta_1=0$ elsewhere The derivation of the distribution $\rho$, also known as the bidirectional reflectance distribution function (BRDF), is given in Section II below.

Note that a number of limitations exist as to the applicability of the model above. These are described in Section III below.

II. Derivation

The model for light distribution $\rho$ is derived as follows.

A. Light as Wave Phenomena

When quantum effects are ignored, light is most accurately modeled as an electromagnetic wave that evolves according to Maxwell's equation. The wave is comprised of a magnetic field H and an electric field E which are mutually orthogonal. Since we consider the interaction of these fields with random media, they are random. The orientation of these vectors defines the state of polarization of the field. In the case of natural light the realizations of these fields assume states of polarization which are uniformly distributed. Consequently, these fields do not have a well defined state of polarization. We will only consider unpolarized waves, so we only have to consider the behavior of one of the components of either the magnetic or the electric field. Let us denote this scalar (complex) quantity by $\phi(x,t)$. When the field is far away from any source, the evolution of this field is given by the wave equation in free-space:

$$\nabla^2\phi = \frac{1}{c^2}\frac{\partial^2}{\partial t^2}\phi, \qquad (1)$$

where c is the speed of light. Since the fluctuations of visible light are very large we can assume that the wave is stationary (homogeneous in its time variable). The temporal Fourier transform of the wave is a collection of uncorrelated fields $\psi_\nu(x)$, where $\nu$ is a frequency. Each of these fields satisfies an Helmholtz equation:

$$\nabla^2 \psi_\nu + k^2 \psi_\nu = 0,$$

since the time derivative $\partial^2/\partial t^2$ becomes a multiplication by $(-i\nu)^2 = -\nu^2$ in the Fourier domain. The wave number $k$ is equal to $$k = \frac{2\pi}{\lambda} = \frac{\nu}{c}$$

where $\lambda$ is the wavelength of light. Eq. 1 is used to derive Eq. 2 below. It is obtained by integrating Helmholtz's equation over the surface and assuming that the reflection is planar at each point. See Beckman's monograph for more details on this derivation (P. Beckmann and A. Spizzichino. *The Scattering of Electromagnetic Waves from Rough Surfaces*. Pergamon, New York, 1963).

Note that most wave phenomena occur at all scales down to the wavelength $\lambda$ of light, while radiative transfer models are valid only at a scale $L_0$ comparable to the shape of an object. To go from the wavelength-scale $\lambda$ to the larger object scale $L_0$ we introduce an intermediate microscale L. Hierarchical schemes similar in spirit were introduced by Kajiya (Kajiya, J. T., "Anisotropic Reflection Models," *ACM Computer Graphics* (SIGGRAPH '85) 19(3): 15–21 July (1985)) and by Westin et al., (Westin, S. H. et al., "Predicting Reflectance Functions from Complex Surfaces," *ACM Computer Graphics* (SIGGRAPH '92) 26(2):255–264 July (1992)). We assume that each scale is separated by at least one order of magnitude in scale such that:

$$\lambda \ll L \ll L_0.$$

We will often use the approximation that $L/\lambda$, $L_0/L \to \infty$. This is a very convenient mathematical trick which greatly simplifies the derivations (see Beckmann, supra).

Let $\psi_1$ be a wave incident on the surface. Assume that the light source is at a distance much larger than the wavelength scale $\lambda$. Let $k_1 = k\hat{k}_1$ be the direction of this wave. Thus $$\psi_1(x) = \psi_{1,0} e^{i k_1 \cdot x}.$$

From Kirchhoff's theory of surface scattering, the reflected wave at a viewing point $x_2$ sufficiently far from the reflection point is equal to the following integral over the surface A at the microscale (see Beckmann, supra at 22):

$$\psi_2 = \psi_{1,0} \frac{i e^{ikR_O}}{4\pi R_O} (F\mathbf{v} - \mathbf{p}) \cdot \int_A \hat{n} e^{i\mathbf{v}\cdot\mathbf{r}} d\mathbf{r}, \qquad (2)$$

where $R_O$ is the distance from the reflection point to the viewing point $x_2$, F is the Fresnel reflection coefficient, k is the wavenumber of the wave, $\hat{n}$ is the normal of the surface at $r=(x,y,h(x,y))$ and the vectors $\mathbf{v}$ and $\mathbf{p}$ are defined as $$\mathbf{v} = k_1 - k_2$$

$$\mathbf{p} = k_1 + k_2.$$

The vector $k_2$ is equal to the unit vector $\hat{k}_2$ pointing from the origin of the surface towards the point $x_2$ multiplied by the wavenumber k. Apart from the assumptions that both the source and the receiver are far from the reflection point, we have also made the following two assumptions. First, the surface is smooth at the wavelength-scale such that at each point the wave reflection can be approximated by a planar reflection. Second, the Fresnel coefficient F is replaced by its average value over the normal distribution of the surface and can thus be taken out of the integral.

Let us rewrite Eq. (2) in a more compact form as follows:

$$\psi_4 = C_0 F I, \qquad (3)$$

where $$C_0 = \frac{\psi_{1,0} i e^{ikR_0}}{4\pi R_0}$$

The right most term, I is the integral we wish to compute. Our first simplification exploits the fact that the microscale L is much larger than the wavelength. This permits us to replace the finite bounds of the integral by infinite ones. Secondly, we replace the integration over r by an integration over the projected surface onto the xy-plane, i.e., $r \to (x, y)$. After carrying out these manipulations our integral is $$I = \int_{-\infty}^{\infty}\int_{-\infty}^{\infty} (-h_x(x, y), -h_y(x, y), 1) e^{ikwh(x,y)} e^{ik(ux+vy)} dx\, dy,$$

where $\mathbf{v}=(ku, kv, kw)$. In general, this integral does not exist for most functions. However, for the class of random functions having finite variance considered here, the integral is meaningful. The integrand can be simplified by noting that $$(-h_x, -h_y, 1) e^{ikwh} = \frac{1}{ikw}(-p_x, -p_y, ikwp) = n(x, y),$$

where $$p(x,y) = e^{ikwh(x,y)},$$

It follows directly from these definitions that our integral is the two-dimensional Fourier transform of the random vector function n(y):

$$I = N(ku, kv) = \int_{-\infty}^{\infty}\int_{-\infty}^{\infty} n(x, y) e^{ik(ux+vy)} dx\, dy,$$

Let P(ku, kv) be the Fourier transform of the function p. We observe that differentiation with respect to x (respectively, y) in the Fourier domain is equivalent to a multiplication of the Fourier transform by $-iku$ (respectively, $-ikv$). This leads to the simple relationship $$N(ku, kv) = \frac{1}{wk} P(ku, kv) \mathbf{v},$$

We have thus related the complicated integral I directly to the Fourier transform of the function p. Now since $$f\mathbf{v} = F\mathbf{v}\cdot\mathbf{v} - \mathbf{p}\cdot\mathbf{v} = 2k^2 F(1 - \hat{k}_1 \cdot \hat{k}_2),$$

the scattered wave of Eq. 3 is equal to $$\psi_2 = C_0 \frac{2kF(1 - \hat{k}_1 \cdot \hat{k}_2)}{w} P(ku, kv), \qquad (4)$$

This result shows that the scattered wave field is directly related to the Fourier transform of a simple function of the surface height. We now proceed to use this result to compute the BRDF.

B. Power Considerations and Radiative Transfer

The computation of the BRDF requires us to compute the average of the power area density of the incoming and scattered waves. Since the scattered wave has the simple form given by Eq. 4, we directly know that the average power area density reflected from the surface is:

$$dI_{\psi 2} = \langle |\psi_2|^2 \rangle = \langle \psi_2 \psi_2^* \rangle = \frac{\psi_{0,1}^2 4k^2 F^2 (1 - \hat{k}_1 \cdot \hat{k}_2)^2}{(4\pi)^2 R_0^2 w^2} \langle P(ku, kv) P^*(ku, kv) \rangle. \quad (5)$$

The average on the right hand side of this equation can be written in terms of the spectral density of the random function p. Since we are computing the average over a surface dA, we have:

$$\langle (P(ku,kv)) P^*(ku,kv) \rangle = S_p(ku,kv) dA + (2\pi)^2 |\mu_p|^2 \delta_2(ku,kv) dA.$$

Using the fact that for the delta function:

$$\delta_2(ku, kv) = \frac{1}{k^2} \delta_2(u, v),$$

we can rewrite the Eq. 5 as $$dI_{\psi 2} = \frac{\psi_{0,1}^2 F^2 (1 - \hat{k}_1 \cdot \hat{k}_2)^2}{4\pi^2 R_0^2 w^2} (k^2 S_p(ku, kv) dA + (2\pi)^2 |\mu_p|^2 \delta_2(u, v) dA). \quad (6)$$

On the other hand, the power area density of the incoming wave is $$I_{\psi 1} = \psi_{1,0}^2$$

Since the surface is assumed to be random, the waves reflected off of it are also random. Consequently, only average properties of the wave can be computed and measured. One such quantity is the flow of energy (power) carried by the wave. The power contained in a wave $\psi$ flowing through a surface patch dA is equal to $$dP_1 = I_\psi \cos \theta dA, \quad (7)$$

where $$I_\psi = \langle |\psi|^2 \rangle,$$

is the power area density contained in the wave and (.) denotes a statistical (ensemble) average (A Papoulis, *Probability, Random Variables, and Stochastic Processes*. McGraw-Hill, Systems Science Series, New York (1965)). The average depends on the probability densities of the surface. $\theta$ is the angle between the direction of the wave and the normal to the surface patch. The power just introduced is defined at the object scale and is thus the key quantity to relate wave phenomena to radiative phenomena.

Radiative transfer is a phenomenological theory for the propagation of light which assumes that light travels along geometrical rays (M. Planck. *The Theory of Heat Radiation*. Dover, New York 1959). The fundamental quantity in this theory is the radiance L, which describes the density of power radiated per projected unit area and solid angle:

$$d^2 P_r = L \cos \theta dA dw. \quad (8)$$

The radiance is a function of both position x and unit direction $\hat{k}$. The solid angle dw has its base at x and is centered around $\hat{k}$. The bidirectional reflectance distribution function $\rho$ relates the incoming radiance $L_1$ from a direction $\hat{k}_1$ to the reflected radiance $L_2$ in another direction $\hat{k}_2$ (X. D. He et al., "A Comprehensive Physical Model for Light Reflection." *ACM Computer Graphics* (SIGGRAPH '91), 25(4):175–186, July 1991):

$$\rho(\hat{k}_1, \hat{k}_2) = \frac{dL_2}{L_1 \cos\theta_1 dw_1},$$

where $\theta_1$ is the angle between the surface normal and $\hat{k}_1$ and $dw_1$ is the incoming solid angle. Similarly we define $\theta_2$ and $dw_2$ for the reflected radiance in direction $\hat{k}_2$.

The BRDF involves the computation of both the incoming and the outgoing radiance. If we assume that the wave power $P_w$ of Eq. 7 is equal to the radiative power $P_r$ of Eq. 8, then the radiance is related to the average power area density:

$$I_\psi = L dw$$

Using this relation for both the incoming and outgoing fields, we can relate the wave quantities to the radiative ones as follows:

$$I_{\psi 1} = L_1 dw_1 \text{ and } dI_{\psi 2} = dL_2 dw_2$$

From these relations we can write down the BRDF directly in terms of the averaged power of the wave quantities:

$$\rho = \frac{dI_{\psi 2} R_0^2}{I_{\psi 1} \cos\theta_1 \cos\theta_2 dA}, \quad (9)$$

where we have used the geometrical fact that $dw_2 = \cos\theta_2 dA/R^1_0$. We have thus expressed the BRDF solely in terms of the incoming and reflected waves.

C. Computation of the BDRF

We can now combine Eq. 6 and Eq. 9 to get an expression for the BRDF:

$$\rho = \frac{F^2(1 - \hat{k}_1 \cdot \hat{k}_2)^2}{\cos\theta_1 \cos\theta_2 w^2} \left( \frac{k^2}{4\pi^2} S_p(ku, kv) + |\mu_p|^2 \delta_2(u, v) \right). \quad (10)$$

This shows that the BRDF of any surface is directly related to the spectral density of a simple function of the surface.

III. Application of the Model

Figure 4:
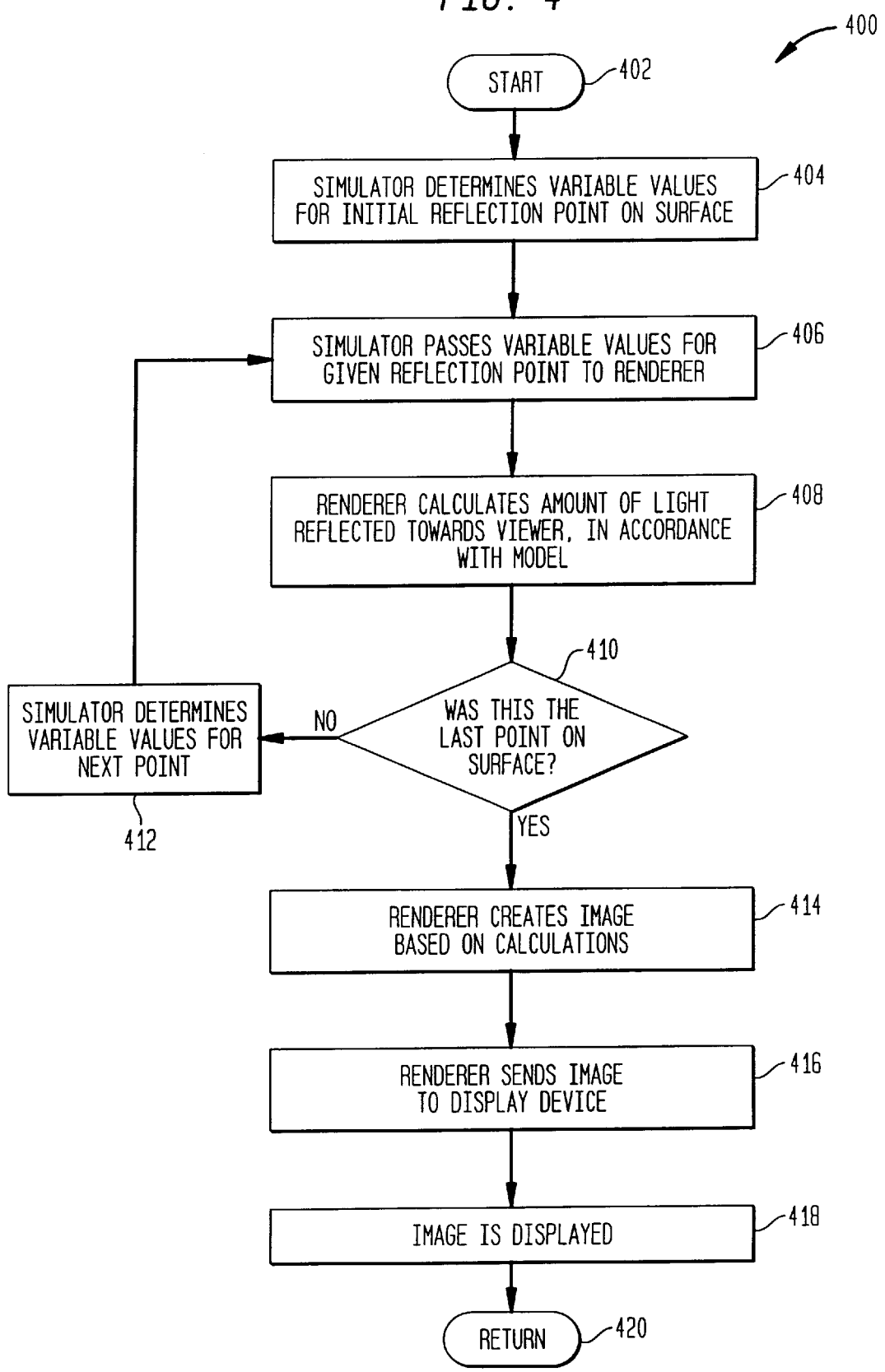
FIG. 4 is a flowchart illustrating the overall process of simulating the reflection of light by an anisotropic surface, according to an embodiment of the invention.

In an embodiment of the invention, the model described above is used according to the following process, illustrated in FIG. 4. In step 404, the simulator defines an initial starting point on the anisotropic surface that is to be rendered, and determines the values for the variables required by the above model. In step 406 the simulator passes the values to the renderer. In step 408, the renderer uses the variable values and the model to calculate the amount of light reflected from the point towards the viewer. If there are additional surface points for which the amount of reflected light must be calculated (step 410), then, in step 412, the simulator determines the variable values associated with the next surface point for which reflection must be calculated. The steps of passing the values associated with a point to the renderer and calculating the light reflected are repeated until the amount of reflected light is calculated for all desired points on the surface.

When all calculations are completed for all surface points, the renderer creates an image of the surface in step 414, based on these calculations. In step 416, the renderer sends the image to a display device. In step 418, the image is displayed.

A. Alternative formulations of $S_p$

Note that in addition to the formula for $S_p$ given above in Section I, this function may be rewritten in a number of ways. For a correlation function given by $$C_h(\Delta x, \Delta y) = e^{\frac{-\Delta x^2}{Tx^2}} e^{\frac{-\Delta y^2}{Ty^2}}$$

the function $S_p$ is given by $$S_p(ku, kv) = \pi e^{-g} T_x T_y \sum_{m=0}^{\infty} \frac{g^m}{m!m} e^{-\frac{k^2 u^2 T x^2}{4m}} e^{-\frac{k^2 v^2 T y^2}{4m}}.$$

Here, $T_x$ and $T_y$ are correlation distances in the x and y directions, respectively, and $g=k^2 w^2 \sigma^2_h$. If $g \gg 1$ and the standard deviation of the surface is much larger than the wavelength, then $$S_p(ku, kv) \approx \frac{\pi T_x T_y}{g} e^{-\frac{k^2 u^2 T x^2}{4g}} e^{-\frac{k^2 v^2 T y^2}{4g}}$$

If the correlation function $C_h$ is approximated to its value near the origin, $y \approx 0$, $$C_h(x,y) \approx 1 + \epsilon(x,y)$$

and $g \gg 1$, then $$S_p(ku, kv) \approx \int_{-\infty}^{\infty} \int_{-\infty}^{\infty} e^{g\epsilon(x,y)} e^{ik(ux+vy)} dx dy.$$

If the surface can be modeled by the correlation function $$C_h(x,y) = e^{\frac{-|x|}{Tx}} e^{\frac{-|y|}{Ty}} \text{ then}$$

$$S_p(ku, kv) = 4T_x T_y e^{-g} \sum_{m=1}^{\infty} \frac{g^m m^2}{m!} (m^2 + k^2 u^2 T_x^2)^{-1} (m^2 + k^2 v^2 T_y^2)^{-1}.$$

If this same $C_h$ can be used and $g \gg 1$, then $$S_p(ku,kv) \approx 4T_x T_y g^2 (g^2 + k^2 u^2 T_x^2)^{-1} (g^2 + k^2 v^2 T_y^2)^{-1}.$$

B. Surfaces having periodic profiles

Many surfaces have a microstructure that is made out of similar "bumps". A good example is a compact disk which has small bumps that encode the information distributed over each "track"[1]. The distribution of bumps is random along each track but the tracks are even spaced. In this section general formulae for certain shapes of bumps are derived, and the specialized results for a CD-shader are discussed.

[1] In reality there is only one long spiral-like track on a compact disk. In practice, this long track can be approximated by many concentric tracks of decreasing radii.

Figure 5A:
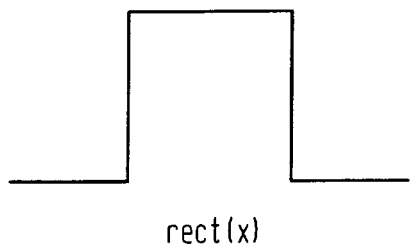
FIGS. 5A through 5C depict functions used to model bumps on an anisotropic surface, according to an embodiment of the invention.

Assume that the surface is given by a superposition of bumps:

$$h(x,y) = \sum_{n=-\infty}^{\infty} \sum_{m=-\infty}^{\infty} b(x - x_n, y - y_m), \tag{11}$$

where the locations $(x_n, x_m)$ are assumed to be either regularly spaced or randomly (Poisson) distributed. To handle the two cases simultaneously we assume that $x_n$ is evenly spaced and that $y_n$ is Poisson distributed. Extensions to the case where both locations are evenly spaced or where both are Poisson distributed should be obvious from the results. Assume that the constant spacing between the $x_n$ is equal to $\Delta x$, i.e., $x_n = n\Delta x$. The random Poisson distribution of the locations $y_m$ is entirely specified by a density $v_y$ of bumps per unit length. The function $b(x,y)$ appearing in Eq. 11 is a "bump function": a function with (small) finite support. It is assumed that the bump function has the following form:

$$b(x,y) = h_0 g(x/a, y/b) rect(x/a) rect(y/b), \tag{12}$$

where a, b and $h_0$ define the width, length and height of each bump respectively, and $a \leq x$. The function rect illustrated in FIG. 5A is the "rectangle" function of support $[-\frac{1}{2}, \frac{1}{2}]$:

$$rect(t) = \begin{cases} 1 & \text{when } |t| \leq 1/2 \\ 0 & \text{else} \end{cases}$$

Figure 5B:
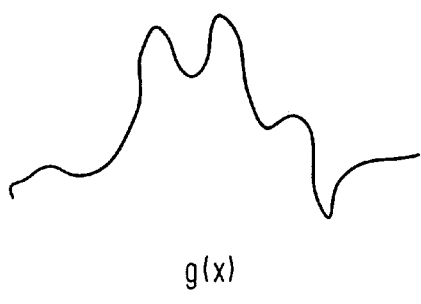
Figure 5C:
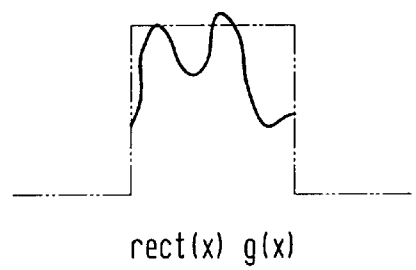

The function $g(x, y)$ is left arbitrary for now. An illustrative function $g(x)$ is given in FIG. 5B. Below we will consider special cases for this function for which the resulting integrals can be computed analytically. FIG. 5 illustrates our definition of a bump. The function $p(x,y)$ in this case is equal to:

$$p(x, y) = 1 + \sum_{n=-\infty}^{\infty} \sum_{m=-\infty}^{\infty} f((x - x_n)/a, (y - y_m)/b), \tag{13}$$

where $$f(x,y) = (e^{ag(x,y)} - 1) rect(x) rect(y)$$

and $a = kwh_0$. The constant term "1" accounts for the space between the bumps and will only contribute a delta spike to the resulting BRDF. This term can therefore be safely dropped from the remaining analysis.

A simple computation shows that the Fourier transform of the function $p(x,y)$ is equal to (remembering that the constant term "1" in Eq. 13 is dropped)

$$P(u,v) = \sigma_x(u) \sigma_y(v) ab F(au, bv),$$

where $F(u, v)$ is the Fourier transform of $\theta(x, y)$ and $$\sigma_x(u) = \sum_{n=-\infty}^{\infty} e^{iun\Delta x} \text{ and } \sigma_y(v) = \sum_{m=-\infty}^{\infty} e^{ivy_m}. \tag{14}$$

To compute the spectral density, note that:

$$S_p(u,v) = (ab)^2 |F(au, bv)| |\sigma_x(u)|^2 \langle|\sigma_y(v)|^2\rangle.$$

Since it was assumed that the locations $y_m$ correspond to a homogeneous Poisson like random process, we have the result that (see Papoulis, A., *Probability, Random Variables, and Stochastic Processes*, McGraw-Hill, Systems Science Series, p. 561, New York (1965):

$$\langle|\sigma_y(v,N)|^2\rangle = 2\pi v^2_y \delta(v) + v_y.$$

(The delta term is dropped in the remainder since we are interested in the incoherent part of the reflected intensity). The sum of evenly spaced location $x_n$ is a bit harder to deal with. First note the following two results from the theory of distributions (see pp. 54–55, Zemanian, A. H., *Distribution*

*Theory and Transform Analysis: An Introduction to Generalized Functions, with Applications,* Dover, New York (1987)):

$$\sum_{n=-\infty}^{\infty} e^{iun} = 2\pi \sum_{n=-\infty}^{\infty} \delta(u-2\pi n) \text{ and } \delta(sz+t) = \frac{1}{s}\delta(z+t/s),$$

where $s>0$ and $t$ are real numbers. The first of these two equalities is known as "Poisson's summation formula". Using these results the sum $\sigma_x$ can be expressed in terms of delta distributions only:

$$\sigma_x(u) = \frac{2\pi}{\Delta x}\sum_{n=-\infty}^{\infty}\delta(u-n2\pi/\Delta x).$$

The square of this function is equal to $$|\sigma_x(u)|^2 = \sigma_x(u)\sigma_x(u)^* = \frac{(2\pi)^2}{\Delta x^2}\sum_{n=-\infty}^{\infty}\sum_{m=-\infty}^{\infty}\delta(u-2\pi n/\Delta x)\delta(u-2\pi m/\Delta x)$$

$$= \frac{(2\pi)^2}{\Delta x^2}\sum_{n=-\infty}^{\infty}\delta(u-2\pi n/\Delta x).$$

The "spectral density" $S_p$ can now be computed by putting all these computations together:

$$S_p(ku, kv) = b^2 v_y \lambda \sum_{n=-\infty}^{\infty} |F_n(kv)|^2 \delta(u-n\lambda/\Delta x), \quad (15)$$

where $$F_n(kv) = \frac{a}{\Delta x}F(2\pi na/\Delta x, kv),$$

given the following identities $$\delta(ku) = \frac{1}{k}\delta(u), \text{ and } \lambda = \frac{2\pi}{k}.$$

When evaluating the BRDF the values u and v (and w) are determined by the incoming and outgoing angles. The incoming light is usually assumed to be an incoherent sum of many monochromatic waves whose number is proportional to the distribution $L(\lambda)$ of the light source. To determine the intensity and the color of the light that is reflected in the outgoing direction we first compute the wavelengths $\lambda_n$ for which both $L(\lambda)$ is non zero and for which the delta spikes in Eq. 15 are non-zero. This only occurs when:

$$\lambda_n = \frac{\Delta xu}{n}.$$

Figure 6:
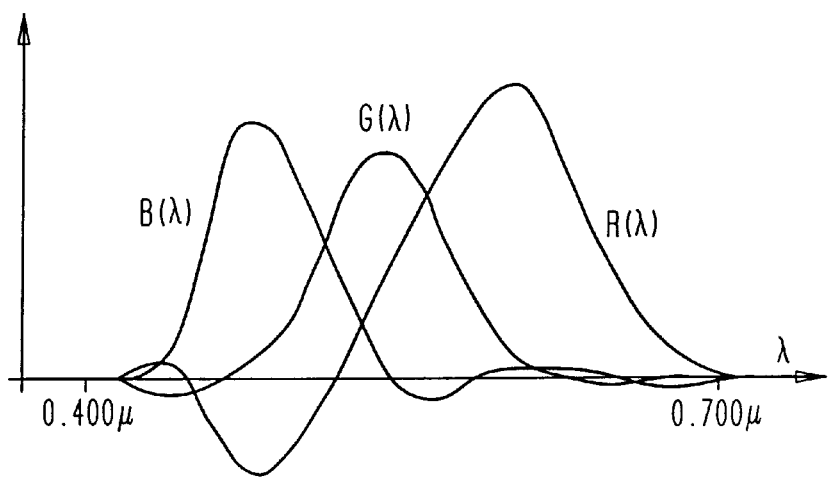
FIG. 6 illustrates spectral response for red, green, and blue.

In general visible light is comprised only of waves with wavelengths between $\lambda_{min}=0.3$ μm and $\lambda_{max}=0.8$ μm. This means that the indices n are constrained to lie in the range:

$$N_{min} = \frac{\Delta xu}{\lambda_{max}} \le n \le \frac{\Delta xu}{\lambda_{min}} = N_{max}$$

if $u>0$ and $$N_{min} = \frac{\Delta xu}{\lambda_{min}} \le n \le \frac{\Delta xu}{\lambda_{max}} = N_{max}$$

when $u<0$. Once these wavelengths are determined the R,G and B components of the spectral density are computed as $$S_{p,red} = b^2 v_y \sum_{n=N_{min}}^{N_{max}} \lambda_n R(\lambda_n) L(\lambda_n) \left|F_n\left(\frac{2\pi v}{\lambda_n}\right)\right|^2,$$

$$S_{p,green} = b^2 v_y \sum_{n=N_{min}}^{N_{max}} \lambda_n G(\lambda_n) L(\lambda_n) \left|F_n\left(\frac{2\pi v}{\lambda_n}\right)\right|^2,$$

$$S_{p,blue} = b^2 v_y \sum_{n=N_{min}}^{N_{max}} \lambda_n B(\lambda_n) L(\lambda_n) \left|F_n\left(\frac{2\pi v}{\lambda_n}\right)\right|^2,$$

where $R(\lambda)$, $G(\lambda)$ and $B(\lambda)$ are the spectral response curves for red, green and blue. The general shape of these three functions are depicted in FIG. 6.

Had we assumed that the locations $x_i$ were also Poisson distributed with density $v_x$, then the spectral density would have been equal to:

$$S_p(ku,kv) = (ab)^2 v_x v_y |F(aku,bkv)|^2.$$

This expression is much simpler than when a regular spacing is present.

So far we have not specified the precise size of the bump given by the function $g(x, y)$ (see Eq. 12). In the next section we give some examples for which the corresponding function $F(u, v)$ can be computed analytically.

Consider two special cases for the multiplicative function $g(x, y)$:

$$g_0(x,y)=1 \text{ and } g_1(x,y)=\frac{1}{2}+x. \quad (16)$$

Figure 7A:
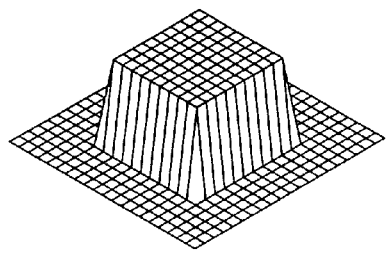
FIGS. 7A and 7B illustrate models of two special cases of bumps, according to an embodiment of the invention.
Figure 7B:
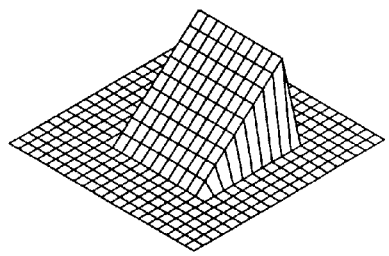

The bumps corresponding to each of these functions are depicted in FIG. 7A and FIG. 7B respectively. The Fourier transforms of the corresponding function $f(x,y)$ can be computed analytically for both profiles:

$$F_0(u,v)=(e^{ia}-1)\text{sinc}(u/2)\text{sinc}(v/2),$$

$$F_1(u,v)=(e^{ia/2}\text{sinc}((a+u)/2)-\text{sinc}(u/2))\text{sinc}(v/2),$$

where the "sinc" function is equal to $$\text{sinc}(u) = \frac{\sin(u)}{u}.$$

Their squares are equal to $$|F_0(au,bv)|^2 = 2(1-\cos(kwh_0))\text{sinc}^2(au/2)\text{sinc}^2(bv/2),$$

$$|F_1(au, bv)|^2 = \left(\begin{array}{c}\text{sinc}^2\left(\frac{kwh_0+au}{2}\right)+\text{sinc}^2\left(\frac{au}{2}\right) \\ -2\text{sinc}\left(\frac{kwh_0+au}{2}\right)\text{sinc}\left(\frac{au}{2}\right)\end{array}\right)\text{sinc}^2(bv/2).$$

The function $g_0(x, y)$ can be used to model compact disks for example. For this case typical values for the parameters are

| | |
|---|---|
| $h_0$: | height of a bump (0.15 $\mu$m) |
| a: | width of a bump (0.5 $\mu$m) |
| b: | length of a bump (1 $\mu$m) |
| $\Delta$x: | separation between the tracks (2.5 $\mu$m) |
| $v_y$: | density of bumps on each track (0.5($\mu$m)$^{-1}$) |

C. Limitations on the model

Given the model's derivation described above in Section II, several limitations exist in the applicability of the model. First, the surface from which reflection is being simulated is assumed to be stochastically smooth. Second, the Fresnel coefficient must not vary significantly over the surface. Also, several optical phenomena are not addressed by the model. The model does not take into account the effects of subsurface scattering or the multiple scattering of waves at the surface. Moreover, the effects of polarization are not taken into account.

IV. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A method for performing computer graphic simulation of an anisotropic surface reflecting light towards a viewer, the method comprising the steps of:

(a) obtaining data necessary to calculate the amount of light reflected from each point of the anisotropic surface toward the viewer, said data comprising the direction from which the incident light strikes the surface, the direction of the light reflected towards the viewer, the refractive index of the surface, the wavelength of the incident light, and a statistical description of the roughness of the surface;

(b) sending said data to a renderer;

(c) calculating the amount of light reflected from each point of the anisotropic surface toward the viewer, using the formula $$\rho = \frac{F^2(1-\hat{k}_1 \cdot \hat{k}_2)^2}{\cos\theta_1 \cos\theta_2 w^2} \left( \frac{k^2}{4\pi^2} S_p(ku, kv) + |\mu_p|^2 \delta_2(u, v) \right)$$

wherein F=F($\theta_1$, $n_\lambda$), the Fresnel coefficient;

$n_\lambda$ is the refractive index of the surface;

$\theta_1$ is the angle between the incident light and the surface's normal vector;

$\theta_2$ is the angle between the direction of the light reflected towards the viewer and the surface's normal vector;

w=$-\cos\theta_1-\cos\theta_2$;

$\hat{k}_1$ is a unit vector pointing from a reflection point on the surface towards a light source;

$\hat{k}_2$ is a unit vector pointing from a reflection point towards the viewer;

k=$2\pi/\lambda$;

$\lambda$ is the wavelength of the incident light;

$$S_p(ku, kv) = \sigma_p^2 \int_{-\infty}^{\infty} \int_{-\infty}^{\infty} C_p(x, y) e^{ik(ux+vy)} dx dy;$$

u=$-\cos\phi_1\sin\theta_1-\cos\phi_2\sin\theta_2$;

v=$\sin\phi_1\sin\theta_1-\sin\phi_2\sin\theta_2$;

$\phi_1$ is a first spherical coordinate of the direction of the incident light;

$\phi_2$ is a first spherical coordinate of the direction of the light reflected towards the viewer;

$C_p(x,y)$ is a correlation function of a function p(x,y);

$\sigma_p$ is the standard deviation of the function p(x,y):
p(x,y)=$e^{(ikwh(x,y))}$;

h(x,y) is the height of the surface at a point (x,y);

$\mu_p$=$X_1$(kw);

$X_1$ is a characteristic function of the function p(x,y); and $\delta_2$ is a 2-dimensional delta function, wherein
$\delta_2$(u,v)=1 is u=v=0, $\theta_1=\theta_2$, $\theta_2=\pi-\theta_1$=0 elsewhere; and (d) creating an image based on the results of step (c).

2. The method of claim 1, wherein the renderer of step (b) is a physics-based renderer.

3. The method of claim 1, wherein step (c) comprises calculation of $S_p$(ku, kv) using the formula $$S_p(ku, kv) = \sigma_p^2 \int_{-\infty}^{\infty} \int_{-\infty}^{\infty} C_p(x, y) e^{ik(ux+vy)} dx dy.$$

4. The method of claim 1, wherein step (c) comprises calculation of $S_p$(ku,kv) using the formula $$S_p(ku, kv) = \pi e^{-g} T_x T_y \sum_{m=0}^{\infty} \frac{g^m}{m!m} e^{-\frac{k^2u^2T_x^2}{4m}} e^{-\frac{k^2v^2T_y^2}{4m}}$$

wherein g=$k^2w^2\sigma_h^2$;

$\sigma_h$ is a standard deviation function for the height h; and $T_x$ and $T_y$ are correlation distances in the x and y directions, respectively.

5. The method of claim 1, wherein step (c) comprises calculation of $S_p$(ku, kv) using the formula $$S_p(ku, kv) \approx \frac{\pi T_x T_y}{g} e^{-\frac{k^2u^2T_x^2}{4g}} e^{-\frac{k^2v^2T_y^2}{4g}}$$

wherein g=$k^2w^2\sigma_h^2$;

$\sigma_h$ is a standard deviation function for the height h; and $T_x$ and $T_y$ are correlation distances in the x and y directions, respectively.

6. The method of claim 1, wherein step (c) comprises calculation of $S_p$(ku, kv) using the formula $$S_p(ku, kv) \approx \int_{-\infty}^{\infty} \int_{-\infty}^{\infty} e^{-gC(x,y)} e^{ik(ux+vy)} dx dy.$$

wherein g=$k^2w^2\sigma_h^2$;

$\sigma_h$ is a standard deviation function for the height h; and $\epsilon(x,y)$ is an infinitesimal value such that $C_h(x,y) \approx 1+\epsilon(x,y)$ near an origin point, where $C_h(x,y)$ is a correlation function of the height h.

7. The method of claim 1, wherein step (c) comprises calculation of $S_p(ku, kv)$ using the formula $$S_p(ku, kv) = 4T_x T_y e^{-g} \sum_{m=1}^{\infty} \frac{g^m m^2}{m!} (m^2 + k^2 u^2 T_x^2)^{-1} (m^2 + k^2 v^2 T_y^2)^{-1}$$

wherein $g = k^2 w^2 \sigma_h^2$;

$\sigma_h$ is a standard deviation function for the height h; and $T_x$ and $T_y$ are correlation distances in the x and y directions, respectively.

8. The method of claim 1, wherein step (c) comprises calculation of $S_p(ku, kv)$ using the formula $$S_p(ku, kv) \approx 4 T_x T_y g^2 (g^2 + k^2 u^2 T_x^2)^{-1} (g^2 + k^2 v^2 T_y^2)^{-1}$$

wherein $g = k^2 w^2 \sigma_h^2$;

$\sigma_h$ is a standard deviation function for the height h; and $T_x$ and $T_y$ are correlation distances in the x and y directions, respectively.

9. The method of claim 1, wherein step (c) comprises calculation of $S_p(ku, kv)$ using the formula $$S_p(ku, kv) = b^2 v_y \lambda \sum_{n=\infty}^{\infty} |F_n(kv)|^2 \, \delta\left(u - \frac{n\lambda}{\Delta x}\right)$$

wherein b is a function $b(x,y)$, such that $b(x,y) = h_0 g(x/a, y/b) \text{rect}(x/a) \text{rect}(y/b)$;

a, b and $h_0$ define the width, length and height of a surface bump respectively;

$g(x,y)$ is an arbitrary function;

$$\text{rect}(t) = \begin{cases} 1 & \text{when } |t| \leq 1/2, \\ 0 & \text{otherwise;} \end{cases}$$

$v_y$ is a density of bumps per unit length;

$$F_n(kv) = \frac{a}{\Delta x} F(2\pi n a / \Delta x, kv);$$

$F(u, v)$ is the Fourier transform of $f(x, y)$;

$\eta(x,y) = (e^{\alpha g(x,y)} - 1) \text{rect}(x) \text{rect}(y)$;

$\alpha = k w h_0$; $\delta$ is a delta function, equal to 1 if its argument is 0, and equal to 0 otherwise; and $\Delta x$ is a constant spacing between bumps in an x-direction.

10. The method of claim 1, wherein step (c) comprises calculation of $S_p(ku, kv)$ using the formula $$S_p(ku, kv) = b^2 v_y \sum_{n=N_{\min}}^{N_{\max}} \lambda_n R(\lambda_n) L(\lambda_n) \left| F_n\left(\frac{2\pi v}{\lambda_n}\right) \right|^2$$

wherein b is a function $b(x,y)$, $b(x,y) = h_0 g(x/a, y/b) \text{rect}(x/a) \text{rect}(y/b)$;

a, b and $h_0$ define the width, length and height of a surface bump respectively;

$g(x,y)$ is an arbitrary function;

$$\text{rect}(t) = \begin{cases} 1 & \text{when } |t| \leq 1/2, \\ 0 & \text{otherwise;} \end{cases}$$

$v_y$ is a density of bumps per unit length;

$$F_n(kv) = \frac{a}{\Delta x} F(2\pi n a / \Delta x, kv);$$

$F(u, v)$ is the Fourier transform of $f(x, y)$;

$f(x,y) = (e^{\alpha g(x,y)} - 1) \text{rect}(x) \text{rect}(y)$;

$\alpha = k w h_0$;

$N_{max} = \Delta x y / \lambda_{min}$, wherein $\lambda_{min} = 0.3 \, \mu\text{m}$;

$N_{min} = \Delta x u / \lambda_{max}$, wherein $\lambda_{max} = 0.8 \, \mu\text{m}$;

$\lambda_n = \Delta x u / n$;

$R(\lambda_0)$ is a spectral response curve for red; and $L(\lambda_n)$ is a distribution of the incident light.

11. The method of claim 1, wherein step (c) comprises calculation of $S_p(ku, kv)$ using the formula $$S_p(ku, kv) = b^2 v_y \sum_{n=N_{\min}}^{N_{\max}} \lambda_n G(\lambda_n) L(\lambda_n) \left| F_n\left(\frac{2\pi v}{\lambda_n}\right) \right|^2$$

wherein b is a function $b(x,y)$, $b(x,y) = h_0 g(x/a, y/b) \text{rect}(x/a) \text{rect}(b/b)$;

a, b and $h_0$ define the width, length and height of a surface bump respectively;

$g(x,y)$ is an arbitrary function;

$$\text{rect}(t) = \begin{cases} 1 & \text{when } |t| \leq 1/2 \\ 0 & \text{otherwise;} \end{cases}$$

$v_y$ is a density of bumps per unit length;

$$F_n(kv) = \frac{a}{\Delta x} F(2\pi n a / \Delta x, kv);$$

$F(u, v)$ is the Fourier transform of $f(x, y)$;

$f(x,y) = (e^{\alpha g(x,y)} - 1) \text{rect}(x) \text{rect}(y)$;

$\alpha = k w h_0$;

$N_{max} = \Delta u / \lambda_{min}$, wherein $\lambda_{min} = 0.3 \, \mu\text{m}$;

$N_{min}=\Delta xu/\lambda_{max}$, wherein $\lambda_{max}=0.8$ μm;

$\lambda_0=\Delta xu/n$;

$G(\lambda_n)$ is a spectral response curve for green: and $L(\lambda_n)$ is a distribution of the incident light.

12. The method of claim 1, wherein step (c) comprises calculation of $S_p(ku, kv)$ using the formula $$S_p(ku, kv) = b^2 v_y \sum_{n=N_{min}}^{N_{max}} \lambda_n B(\lambda_n) L(\lambda_n) \left| F_n\left(\frac{2\pi v}{\lambda_n}\right) \right|^2.$$

wherein b is a function b(x,y), $$b(x,y)=h_0 g(x/a, y/b)\text{rect}(x/a)\text{rect}(y/b);$$

a, b and $h_0$ define the width, length and height of a surface bump respectively;

g(x,y) is an arbitrary function;

$$rect(t) = \begin{cases} 1 & \text{when } |t| \leq 1/2, \\ 0 & \text{otherwise}; \end{cases}$$

$v_y$ is a density of bumps per unit length;

$$F_n(kv) = \frac{a}{\Delta x} F(2\pi na/\Delta x, kv);$$

F(u, v) is the Fourier transform of ƒ(x, y);

$$f(x,y)=(e^{ag(x,y)}-1)\text{rect}(x)\text{rect}(y);$$

$\alpha=kwh_0$;

$N_{max}=\Delta xu/\lambda_{min}$, wherein $\lambda_{min}=0.3$ μm;

$N_{min}=\Delta xu/\lambda_{max}$, wherein $\lambda_{max}=0.8$ μm;

$\lambda_n=\Delta xu/n$;

$B(\lambda_n)$ is a spectral response curve for blue; and $L(\lambda_n)$ is a distribution of the incident light.

\* \* \* \* \*

UNITED STATES PATENT AND TRADEMARK OFFICE
CERTIFICATE OF CORRECTION

PATENT NO. : 6,246,416 B1
DATED : June 12, 2001
INVENTOR(S) : Jos Stam

It is certified that error appears in the above-identified patent and that said Letters Patent is hereby corrected as shown below:

Column 4,
Line 1, please replace "$v_1$" with -- $\theta_1$ --.
Line 23, please replace "$v=\sin\varphi_1\sin\theta_1=\sin\varphi_2 \sin\theta_2$" with -- $v = \sin\varphi_1 \sin\theta_1 - \sin\varphi_2 \sin\theta_2$ --.
Line 31, please replace "$\mu_p X_1(kw)$" with -- $\mu_p = X_1(kw)$ --.
Line 34, please replace with -- $\delta_2 (u,v) = 1$ if $u = v = 0, \theta_1 = \theta_2, \theta_2 = \pi - \theta_1$
        = 0 elsewhere --.

Column 5,
Line 43, please replace "$_{1,0}$" with -- $_{1, 0}$ --.

Column 6,
Line 7, please replace "$\psi_4$" with -- $\psi_2$ --.
Line 13, please insert -- $f = Fv - p$ --.

Column 7,
Line 18, please replace "$<(P(ku,kv)>P^*(ku,kv))$" with -- $<P(ku,kv)P^*(ku,kv)>$ --.
Line 35, please replace "$_{1,0}$" with -- $_{1, 0}$ --.
Line 43, please replace "$P_1$" with -- $P_w$ --.
Line 48, please replace "(.)" with -- <.> --.

Column 8,
Line 33, please repalce "$R^1_0$" with -- $R^2_0$ --.

Column 10,
Line 35, please replace "$e^{ag}$" with -- $e^{\alpha g}$ --.
Line 37, please replace "$a=kwh_0$" with -- $\alpha=kwh_0$ --.
Line 47, please replace "$\theta(x, y)$" with -- $f(x, y)$ --.

Column 12,
Line 46, please replace "$e^{ia}-1$" with -- $e^{i\alpha}-1$ --.
Line 48, please replace "$e^{ia/2}\mathrm{sinc}((a+u)$" with -- $e^{i\alpha/2}\mathrm{sinc}((\alpha+u)$ --.

Column 14,
Line 22, please replace with -- $\delta_2 (u,v) = 1$ if $u = v = 0, \theta_1 = \theta_2, \theta_2 = \pi, -, \theta_1$ --.
        = 0 elsewhere        ; and --.

Column 15,
Line 60, please replace "$\eta(x,y)$" with -- $f(x,y)$ --.
Line 60, please replace "$e^{ag(x,y)}$" with -- $e^{\alpha g(x,y)}$ --.

UNITED STATES PATENT AND TRADEMARK OFFICE
CERTIFICATE OF CORRECTION

PATENT NO. : 6,246,416 B1
DATED : June 12, 2001
INVENTOR(S) : Jos Stam

It is certified that error appears in the above-identified patent and that said Letters Patent is hereby corrected as shown below:

Column 16,
Line 27, please replace "$e^{ag(x,y)}$" with -- $e^{\alpha g(x,y)}$ --.
Line 47, please replace "rect(b/b)" with -- rect(y/b) --.
Line 64, please replace "$e^{ag(x,y)}$" with -- $e^{\alpha g(x,y)}$ --.

Column 17,
Line 2, please replace "$\lambda_0$" with -- $\lambda_n$ --.

Column 18,
Line 14, please replace "$e^{ag(x,y)}$" with -- $e^{\alpha g(x,y)}$ --.

Signed and Sealed this

Ninth Day of July, 2002

Attest:

JAMES E. ROGAN
Attesting Officer       Director of the United States Patent and Trademark Office